July 15, 1969  J. W. DYER ET AL  3,455,049
ASSEMBLAGE FOR CONVERTING PULSATING MOTION TO ROTARY
Filed Nov. 16, 1964  3 Sheets-Sheet 1
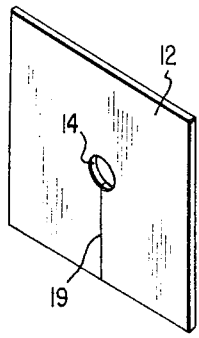
FIG. 3
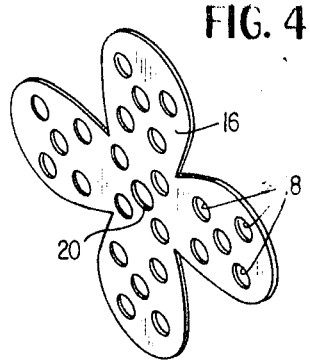
FIG. 4
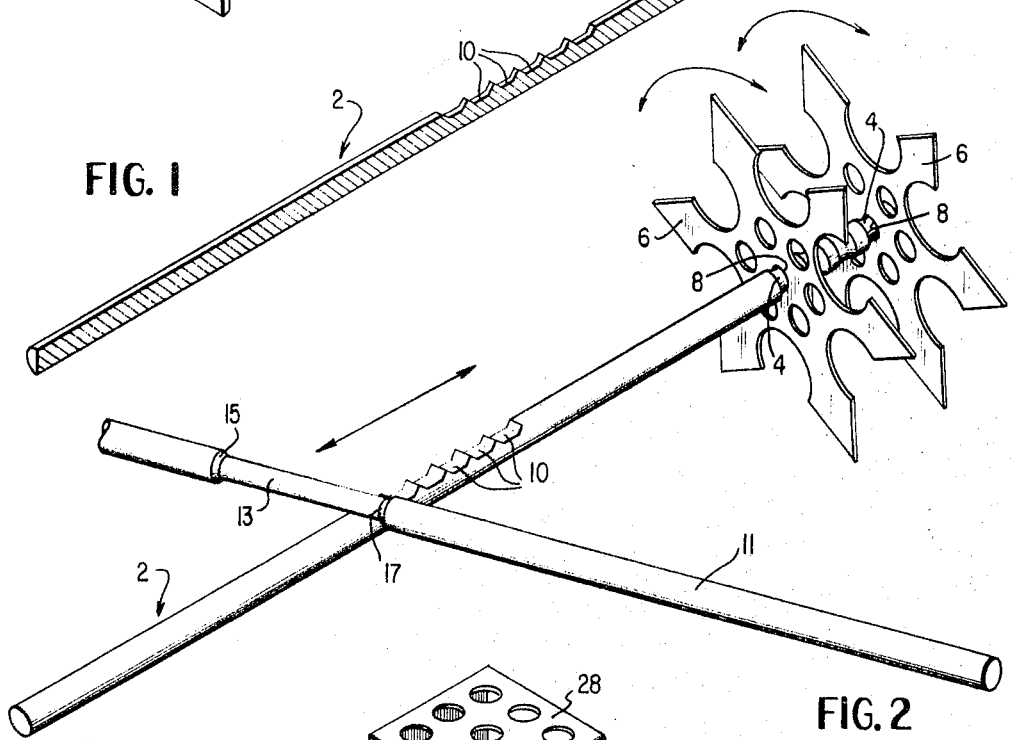
FIG. 1
FIG. 2
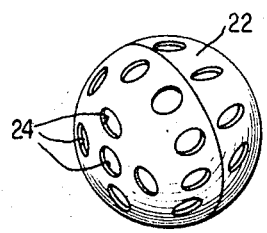
FIG. 5
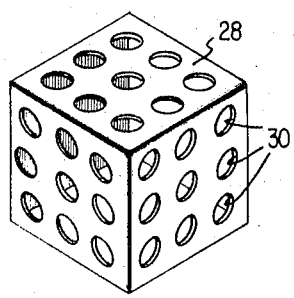
FIG. 6
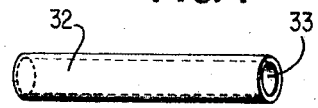
FIG. 7

July 15, 1969   J. W. DYER ET AL   3,455,049
ASSEMBLAGE FOR CONVERTING PULSATING MOTION TO ROTARY
Filed Nov. 16, 1964   3 Sheets-Sheet 2
FIG. 8
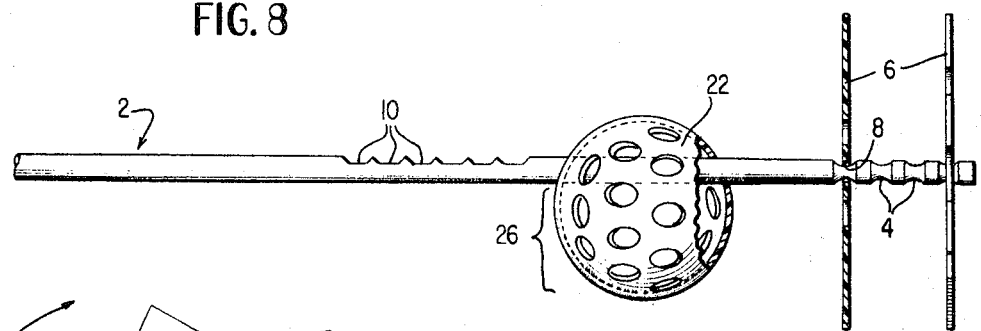
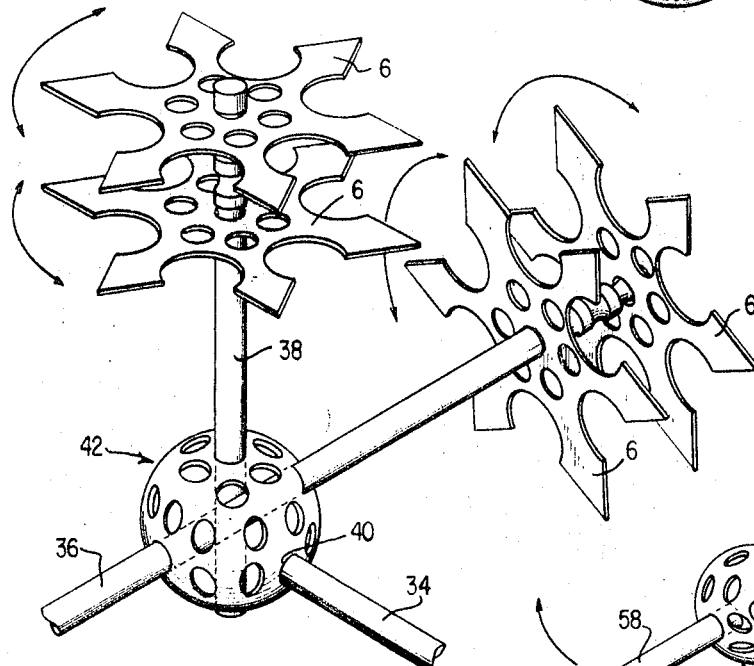
FIG. 9
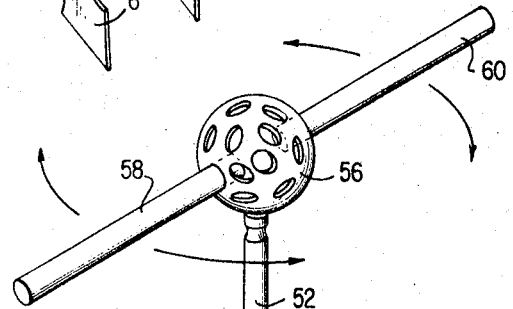
FIG. 10
FIG. 11
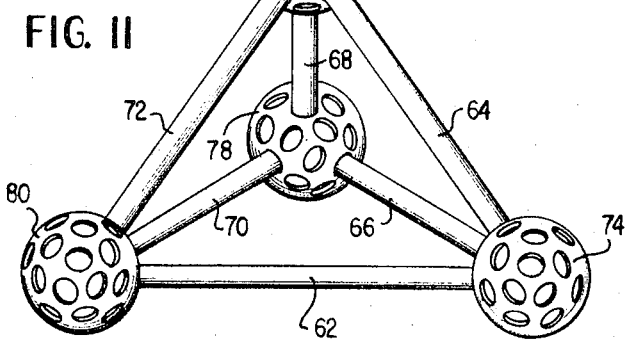

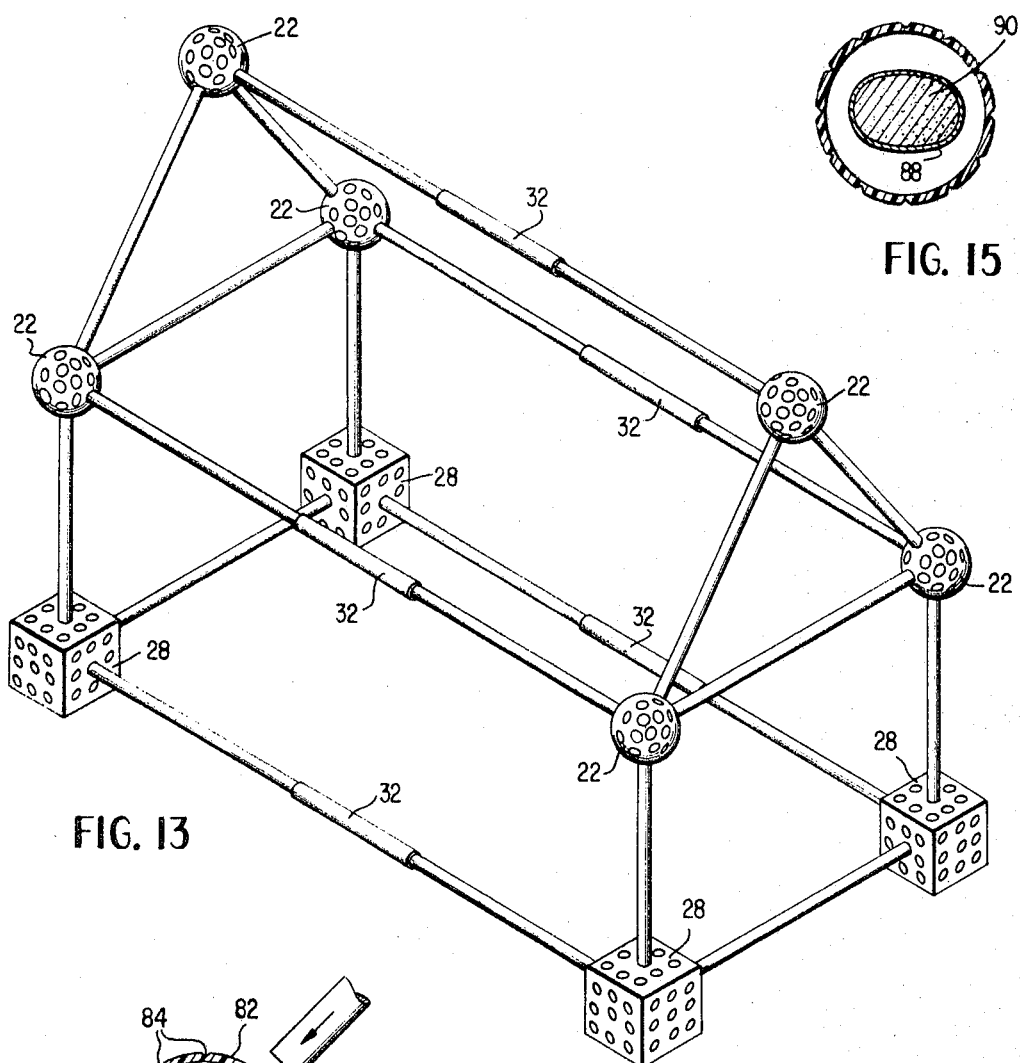

United States Patent Office 3,455,049
Patented July 15, 1969

3,455,049
ASSEMBLAGE FOR CONVERTING PULSATING MOTION TO ROTARY
James W. Dyer, Annandale, and Morris D. Musig, Falls Church, Va., and Asa Berkeley Compton, Silver Spring, Md., assignors to Hardico Manufacturing Company, Alexandria, Va., a corporation of Virginia
Filed Nov. 16, 1964, Ser. No. 411,499
Int. Cl. A63h 33/08
U.S. Cl. 46—16          5 Claims

ABSTRACT OF THE DISCLOSURE

An assemblage which converts pulsating or vibratory energy to rotary motion by transmitting it from a pulse generator through one or more frictionally connected perforated hollow spheres which, in turn, frictionally engage one or more annularly grooved rods or shafts. Rotatable "props" are mounted by their central apertures in the grooves for free rotation. A pulse generator may be a notched stick, rubbed with another stick, but is preferably an eccentrically mounted driven motor.

More particularly, the present invention relates to assemblies for display, amusement, and the like, wherein there is included at least one relatively longitudinal element, hereinafter in this specification called a shaft, and wherein there is also provided one or more perforated elements adapted to be interengageable with one or more shaft elements. These assemblies are particularly designed for motion, for display and for amusement purposes but they may be used also for other purposes. In general the assemblies include different kinds of perforated elements which may serve either as rotating devices or "props" as hereinafter explained, or may serve as structural members for holding other parts and for transmitting energy thereto.

The perforated elements may take one of two general configurations. First, such a perforated element may be configured so as to be readily rotatably moveable with respect to its related shaft. When the perforated element assumes such a configuration it will hereinafter in this specification be called a prop. The word prop, however, shall herein be intended to include any and all assemblies or subassemblies according to the instant invention capable of being rotated by the means hereinafter described. Secondly, a perforated element may be configured so as to be of generally, box-like, configuration. Box-like is herein used in its broadest sense and is intended to include spherical, cylindrical, and all generally polygonally shaped configurations. Such a box-like configuration for a perforated element will hereinafter be alluded to in this specification as a receiver. The scope of the instant invention is such that any given assembly according thereto may comprehend the use of one or more props and/or receivers with a single or a multiplicity of associated shafts. Various uses for the instant invention in its broadest form range from articles of amusement for use by children to articles of extreme size and weight useful as support and interconnecting elements in construction applications.

One purpose of the present invention is that of creating motion of a prop by attaching it to a shaft in such a manner that the prop may be caused to rotate when the outer surface of a secondary element is brushed against notches positioned along the length of the shaft. Impulses are generated by this action which are transmitted to the elements on which rotatable props are mounted, the energy impulses being of such a character as to cause the props to rotate. These waves are then thought to travel along the length of the shaft to the prop and are, in some manner transformed at the prop into motion once again. Early prop-shaft assemblies of this type are exemplified by Patents Nos. 1,492,074 (to Dayton) and 1,645,820 (to Reynolds et al.). A more recent example of such an association is 2,993,296 (to Saastamo).

Such prior art prop-shaft assemblies were inherently defective and undesirable for several reasons. First, the user of the devices resulting therefrom were not readily assemblied nor readily disassembled. Secondly, tacks or nails were frequently incorporated in such devices which necessitated for the creation of prop motion the use of at least four elements; the shaft, the tack or nail, the prop and the vibrator element. Thirdly, the motion created by the use of such devices was of limited or nonexistent variety. Fourthly, these prior art devices, insofar as known, were never configured, prior to the advent of the instant invention, so as to include notched structures permitting the independent rotation of a multiplicity of prop elements on a single shaft. Fifthly, no such prior devices have ever been known to be of such a configuration as to readily allow for the shaft to act not only as an energy wave transmission element but also as a vibrator with respect to another prop carrying shaft. Sixthly, such devices are not able, insofar as the inventors of the instant invention are aware, to control to any satisfactory degree the energy wave transmissions within a shaft.

It has also been known in the art to associate various elongated structural elements such as sticks and shafts with a receiver (a box-like perforated element). However, as in the case of prior art shaft-prop assemblies, such shaft-receiver assemblies were of limited application, and, in no instance known to the instant inventors, ever associated with one or more prop and shaft elements to achieve the unobvious advantageous results of the instant invention. For example, no assembly of shafts and receivers has ever, to the knowledge of the instant inventors, been so related with respect to prop elements as to necessitate the receiver element acting as an energy wave guide in addition, in certain instances, to acting as a multiple shaft interconnecting element.

It has been found, according to the instant invention, that the shortcomings of prior art devices of the nature heretofore discussed may be overcome by means of the present invention. The particular structures used in the present invention for attaching shaft-like elements to perforated receivers have special utility for various purposes aside from the specific purposes of the rotatable display devices which form a preferred embodiment of the present invention.

More particularly, according to the present invention, it has been found advantageous to provide, as a part of the body of the shaft, either integral therewith or by means of separate elements thereabout, notches as mounting locations for the props. Not only is this type of mounting more stable than that obtained with prior art tacks or pins but the utilization of a plurality of notches or annular grooves spaced longitudinally of the shaft will allow for the mounting of a plurality of props thereon. These prop-mounting notches will hereinafter in this specification be referred to as the primary notches to distinguish them from the secondary notches also positioned longitudinally of the shaft as means to facilitate the generation of the previously mentioned energy waves within the shaft.

Also, it has been found that by constructing the prop elements of flexible resilient material and the prop receiving perforations therein of a size slightly smaller than the diameter of the shaft, a snap-engageable action due to the resilient nature of at least one of the elements will result upon the forcible placement of a prop about a primary notch or annular groove in a shaft which will further assure the retention of a prop thereabout but nevertheless not preclude the ready removability of the prop therefrom. It is within the scope and intent of the invention, however, that a prop according to the invention need not necessarily be flexible or resilient but may, for example, be spring biased with one or more lateral slits therein to facilitate the placement of the prop about its related shaft.

It has been found that while one manner by which motion of a prop may be initiated is by rubbing the secondary notches with a rubbing device, the rubber device itself may be configured with primary and secondary notches and have associated therewith one or more prop elements. In this manner the rubbing device may also have generated therewithin prop rotating energy waves. Hereinafter in this specification the rubbed shaft will be referred to as the primary shaft and the rubbing device as the secondary shaft although it is to be understood that neither the secondary shaft nor the primary shaft need actually be shaft-like in configuration.

As will be pointed out hereinafter, in lieu of notches and the rubbing action for generating rotating energy waves, other means are contemplated for accomplishing this purpose.

It has, in addition, been found that by placing a multiplicity of prop elements about several of the primary grooves or notches on any shaft and by carefully controlling the motion of the secondary shaft with respect to the primary shaft, a multitude of motions of the props may be achieved including uniform and nonuniform motion of the props relative to each other at a wide range of prop angular velocities.

It has, in addition, been found that the motion of props on shafts according to the present invention is both appealing to the eye and fascinating to persons of all ages so as to render its utilization in articles of play extremely attractive. However, it has also been found that the basic principle of the instant invention may be used in display articles for advertising and other purposes and also as a teaching device.

By associating a receiver element with a shaft, in the manner which will hereinafter be more fully described, and with also one or more props, it has been found that any given rubbing motion of a secondary shaft with respect to a primary shaft will result in an extremely effective and unusually efficient transmission of energy waves to the primary notches and the props disposed thereabout. It is believed, that a receiver as thus used acts as an energy wave guide. It has been found that a number of receivers and shafts may be interposed between the primary wave generating means and the disposition of one or more props without inhibiting to any great degree the transmissibility of energy waves throughout the overall assembly which are capable of inducing prop rotation.

It has further been found that the size of the apertures in a receiver and the size and construction of the receiver itself may be varied so as to produce particularly unobvious utilitarian results.

It has also been found that a receiver may be used in conjunction with a shaft which need not contain other than primary notches for the purpose of creating an assembly which has a wide variety of uses in the home as a play article or as a practical and useful article of construction. In addition, if any given shaft is to be utilized solely as an energy transmission element, that the primary as well as the secondary notches may be omitted. Also, should the particularly desirable features accruing to the use of the primary slots not be desired, it is within the scope of the present invention that props may be provided with suitably sized apertures, that is, of a size which will permit free rotation on the supporting device, and be placed about the unnotched periphery of a shaft in which energy waves are generated to permit the rotation of such props about the shaft periphery.

The objects and advantages of the invention will become more apparent upon reference to the following specification, claims and appended drawings wherein:

FIGURE 1 is a perspective and partly sectional view of one form of a control shaft element according to the present invention with a plurality of flexible and apertured prop elements supported thereon.

FIGURE 2 discloses the manner in which a secondary shaft, by being rubbed over the secondary notches in the primary shaft may cause prop elements mounted in the primary notches or annular grooves of the primary shaft to rotate.

FIGURE 3 is a plan view of a simple form of a prop having a lateral slit connecting a peripheral portion with the central prop aperture.

FIGURE 4 is a plan view of a decorative prop of another form.

FIGURE 5 is a plan view of one embodiment of a receiver element.

FIGURE 6 is a plan view of a different form of a receiver element.

FIGURE 7 is a plan view of yet another form of receiver element.

FIGURE 8 shows, in perspective, the receiver of FIGURE 4 positioned on a shaft so as to act as a wave guide.

FIGURE 9 is a perspective view of an assembly wherein there is attached to a receiver of the type shown in FIGURE 5, a multiplicity of shafts, at least some of which have primary slots or annular grooves thereon and prop elements rotatably mounted in such slots or grooves.

FIGURE 10 is a perspective view of an assembly wherein receiver, and shaft elements are so related as to create a multiple element prop subassembly of which one receiver forms a part.

FIGURE 11 shows a complex assembly utilizing the receivers of FIGURE 5 as multiple shaft joining means.

FIGURE 12 shows two shaft sections connected together by means of the receiver of FIGURE 7.

FIGURE 13 is a perspective view of a building structure incorporating the various receivers of FIGURES 5, 6 and 7 therein.

FIGURE 14 discloses a receiver adapted for the construction of permanent assemblies according to the instant invention.

FIGURE 15 discloses a receiver of slightly modified form also adapted for use in constructing permanent assemblies according to the instant invention.

Referring more particularly to FIGURE 1, the shaft, shown generally by numeral 2 is substantially cylindrical in shape. A plurality of primary notches or annular grooves 4 are provided at the forward end of the shaft and some of them have props 6 positioned with their apertures 8 about primary notches 4 so that the props can turn freely on the shaft. Secondary notches 10 are provided near the rearward portion of the shaft.

FIGURES 3 and 4 disclose additional configurations which may be assumed by a prop. It may be seen in FIGURE 3 that a slit has been provided connecting one peripheral section of prop 12 with the central aperture 14 thereof. This permits the prop 12 to yieldably pass over the ungrooved parts of a shaft when it is to be mounted in an annular groove. FIGURE 4 discloses a somewhat decorative prop 16 having a plurality of perforations 18 surrounding central aperture 20. The shapes of props 12 and 16 shown in FIGURES 3 and 4 are illustrative only and not intended to be limiting.

Shaft 2 may be constructed of wood, plastic or any other suitable material. Similarly, props 6 may be constructed of a somewhat elastic and/or flexible plastic or cardboard sheet material or any other relatively light material and, as shown, have apertures 8 which are normally slightly smaller than the peripheral portion of shaft 2 and slightly larger than the diameter of the base of primary notches 4. This allows the props 6 to be gently forced or sprung over the relatively large peripheral section of shaft 2 into primary notches 4 and yet allow for the free rotation in and about the base of primary notches 4. The props 6 may obviously be placed in any of the primary notches 4 in control shaft 2 and, therefore, a plurality of props may be placed in such notches in order to obtain a plurality of props capable of simultaneously rotating about the axis of the control shaft 2.

It should be noted however that on occasion it may be desirable to have a prop constructed of relatively light yet inflexible material. In such a situation it is desirable to provide a slit such as that which appears at 19 in FIGURE 3 to permit lateral separation of sections of a prop so as to facilitate the replacement of the prop central aperture about the base of primary notches 4.

As seen in FIG. 2, props 6 may be caused to rotate about shaft 2 by rubbing stick 11 over notches 10.

Props 6 may both be made to spin or rotate simultaneously in a clockwise direction, both counterclockwise or one clockwise and the other counterclockwise, depending upon the manner in which the energy pulses are generated, i.e., the way in which notches 10 in primary shaft 2 are rubbed and the shaft 2 caused to vibrate by the periphery of secondary shaft 11. Both props 6 may be caused to rotate in one direction about control shaft 2 by placing reduced diametral portion 13 of secondary shaft 11 over the secondary notches 10 in primary shaft 2 with a beveled edge or annular wall 15 resting against shaft 2 and moving shaft 11 back and forth longitudinally over notches 10 in shaft 2. The annular wall 15 restricts lateral motion of shaft 2 and imparts directional components of motion to such shaft.

Props 6 may be caused to rotate in the other direction by holding the other beveled edge or annulus 17 resting against control shaft 2 and moving shaft 11 back and forth longitudinally over notches 10 in shaft 2. This obviously inhibits motion in a reverse manner.

To cause one prop 6 to rotate in one direction and another prop 6 to rotate in the opposite direction simultaneously, both props can be caused to first rotate in one direction as described previously. The notch 13 of shaft 11 should then be moved until it is more or less centered between the surfaces 15, 17, over secondary notches 10 in shaft 2. If the rubbing motion is then slowed down, one prop 6 will begin to reverse. By thereupon rapidly speeding up the rubbing again before both props can reverse, both props may be maintained in motion one in a first direction and the other in the opposite direction. A slight nudge with the notch 13 of shaft 11 is sometimes needed to start the reversing.

FIGURE 5 discloses at 22 one form which may be assumed by a receiver element. It may be seen that this spherical element is a hollow ball perforated at a multiplicity of positions 24.

Receiver 22, FIG. 8, is shown positioned about a shaft 2 which, while having prop elements associated therewith may be used in lieu of a secondary or rubbing shaft.

Receiver 22 may be constructed, and is preferably constructed, from any one of the myriad of well known plastic materials possessing the physical characteristics desired in the instant invention, i.e., elasticity, flexibility, durability, ease of manufacture into the desired shape, etc. As in the case of props 6, apertures 24 in receiver 22 are slightly smaller than the peripheral portions of shafts 2 and 11 and slightly larger than the diameter of the base of primary notches 4. In the preferred embodiment, therefore, the receiver 22 may be forced onto the relatively large peripheral section of shaft 2 and the elasticity of the material constituting the walls of aperture 24 will permit stretching sufficient to insure a firm yet releasable engagement between the receiver and the shaft. Also, as will hereinafter be more fully described, when it be desired merely to engage the walls of an aperture 24 of a receiver 22, or with a modification thereof according to the instant invention such as that shown in FIGURE 6, with the base of a primary notch 4, this may easily be done by merely forcing the walls of a receiver aperture 24 over the relatively large peripheral section of shaft 2 and into a position about the base of primary notches 4. In other words, the elastic plastic material can be stretched on the larger parts and thus hold the shaft yieldably by springing into the grooves 4, etc.

As long as the shaft elements may function as energy wave transmission members, as hereinbefore described, it is permissible, and in some applications desirable, that the shaft elements be constructed of relatively flexible material and the receiver elements of relatively rigid material.

FIGURES 9 and 10 disclose relatively complex assemblies of receiver, shaft and prop elements and are indicative of the wide variety of possible structures and motions derivable from such assemblies.

In FIGURE 9 shaft elements 34, 36 and 38 are assembled with a receiver 42 in different ways to achieve different results. Shafts 34 acts as a connecting or structural shaft and also as an energy wave transmission element. Accordingly, shaft 34 may perform its function merely by having one of its primary grooves engaged with the peripheral walls of an aperture 40 in receiver 42.

Shaft 36 performs the same general function as shaft 34 and is also used as a prop support which necessitates the inclusion of prop-positioning grooves thereon.

Shaft 38 functions primarily as an energy wave transmission element in the assembly of FIGURE 9 to carry the pulsations to rotatable props and cause them to rotate in their supporting grooves.

The assemblage of FIGURE 9 is merely indicative of combinations that may be constructed from the basic elements of the instant invention. By attaching an electric motor with an unbalanced motion, e.g., having an eccentric weight on the armature shaft, to one of the shafts of the assemblage, all props on all shafts may be caused to rotate. The rate and direction of motion of each prop will depend on the characteristics and amplitudes of the energy impulses imparted thereto. Thus it can be seen that attractive arrays of innumerable shapes may be constructed.

FIGURE 10 discloses an assembly of receiver and associated shaft elements. As in FIGURE 9, shafts 44, 46 and 48 are taken as structural and relatively immobile energy wave transmission shafts and receiver 50 as the transmitting structural element connecting and positioning in a relatively fixed manner shafts 44, 46 and 48. Shaft 52 is attached to receiver 50 in such a manner that its relatively large peripheral walls engage the relatively smaller walls of apertures 54 in receiver 50, thereby insuring a firm engagement between these members. Also attached to shaft 52, but in a relatively freely rotatable manner is a receiver 56 which has one of its apertures having a diameter in excess of that of the primary notches on shaft 52 and in loose engagement with one of these notches. Outwardly extending from receiver 56 are additional shaft elements 58 and 60. In operation, it may be seen that the subassembly 56–58–60 may be caused to rotate as a whole creating a particularly unusual effect by the transmission of the previously desired energy waves through shafts 44, 46 and 48, receiver 50 and shaft 52 to receiver 56, shaft 58 and shaft 60.

It will be noted from the drawings that all of the receivers of the spherical form as in FIG. 5, element 22, element 42 in FIG. 9 and elements 50 and 56 in FIG. 10, are in the form of hollow balls which are made of resilient plastic material, with perforations of the form generally indicated on the drawings.

FIGURE 11 shows an assemblage of elements in which a series of shafts 62, 64, 66, 68, 70 and 72 are connected to receivers 74, 76, 78 and 80 to create a tent-like structure.

The snap-engageable or resilient frictional connection of a receiver and shaft such as that shown in FIGURES 8, 9 and 10 may be equally usable in the receiver-shaft connections of FIGURE 11.

Particularly when the invention is to be embodied in larger structures, it may become necessary to utilize receivers or connectors such as those shown in FIGURES 6, 7 and 13 at 28–30 and 32–33, respectively, which may be formed in a wide range of sizes and shapes so as to be adapted to receive either a single or a multiplicity of widely differing shaft elements. FIGURE 13 discloses how a house-like structure may be assembled from shafts and receivers of the type disclosed in FIGURES 5, 6 and 7.

FIGURE 14 discloses a special receiver 82 having knock-in sections outlined by grooves 84 containing suitable mastic 86 inside. The use of such a receiver is particularly desirable in certain structural applications of the invention where greater permanence or stability is desired.

As indicated in FIG. 15, the mastic 90 need not fill the whole outer ball or receiver but may be confined within its own cover or container 88.

What is claimed is:

1. An apparatus for converting vibratory pulses of motion into rotational motion of mechanical elements, which comprises, in combination, a hollow walled body having detachable connection means including at least three perforations in its walls, an elongated rod-like element gripped frictionally by walls of one of said perforations thereby to transmit pulses of motion to said rod-like element, said rod-like element having mounting means comprising a plurality of spaced annular grooves each adapted to receive a freely rotatable prop element, a prop element mounted in at least one of said grooves by means of a central opening sized to engage the groove freely while resisting ready removal therefrom, and means connected to another of said perforations in the hollow body for generating said pulses of motion and imparting said vibratory pulses thereto, whereby the prop element may be caused to rotate by reason of said vibratory pulses.

2. Apparatus according to claim 1 including a plurality of said hollow walled bodies and a plurality of other rod-like elements, said bodies being resilient and being interconnected by said other rod-like elements, the latter being gripped by contraction of walls of said perforations whereby said pulses may be transmitted through a plurality of hollow bodies and rod-like members in series.

3. In an assemblage of the character described, the combination which includes a motion transmitting means including a motion-transmitting element, means for generating and imparting a pulsating motion to said motion transmitting element, a multiperforate plastic hollow connector means frictionally coupled with said element by means of one of its perforation walls, rod-like means frictionally coupled to said hollow connector means by another of its perforation walls and bearing a plurality of annular grooves, and plural freely rotatable prop elements engaged in a similar plurality of said grooves by means comprising bearing openings in the prop elements which are sized to snap into said grooves after being forced over ungrooved parts of said rod-like means, the arrangement being such that selective simultaneous rotary motion in either direction or in mutually contrary directions may be imparted to said prop elements by reason of transmission of said pulsating motion from said element through said hollow connector means and said rod-like means.

4. An assemblage according to claim 3 wherein the hollow connector means is a perforate hollow sphere.

5. An assemblage according to claim 3 wherein the rod-like means comprises a single round stick bearing a plurality of spaced annular grooves sized to receive for free rotation and to retain against unintentional removal prop elements placed thereon.

References Cited
UNITED STATES PATENTS

| | | | |
|---|---|---|---|
| 664,382 | 12/1900 | Chapman | 46—47 |
| 903,879 | 11/1908 | Nusly | 46—58 |
| 905,707 | 12/1908 | Jones | 46—138 |
| 1,336,756 | 4/1920 | Pautzke | 46—138 |
| 1,413,294 | 4/1922 | Sharretts | 46—47 |
| 2,208,049 | 7/1940 | Pajeau | 46—29 |
| 2,799,118 | 7/1957 | Lullo | 46—29 X |
| 2,993,296 | 7/1961 | Saastamo | 46—47 |

FOREIGN PATENTS 1,332,044   6/1963   France.

F. BARRY SHAY, Primary Examiner

U.S. Cl. X.R.

40—106.42; 46—29, 47